United States Patent
Staiger et al.

(10) Patent No.: US 6,725,455 B2
(45) Date of Patent: Apr. 20, 2004

(54) METHOD FOR ASSIGNING TASKS, DATA PROCESSING SYSTEM, CLIENT DATA PROCESSING NODES AND MACHINE-READABLE STORAGE MEDIUM

(75) Inventors: Wolfgang Staiger, Wannweil (DE); Rolf Bauer, Korntal (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/313,981

(22) Filed: May 19, 1999

(65) Prior Publication Data

US 2003/0177162 A1 Sep. 18, 2003

(30) Foreign Application Priority Data

May 20, 1998 (DE) .......................................... 198 22 543

(51) Int. Cl.⁷ ................................................. G06F 9/00
(52) U.S. Cl. ........................ 718/102; 709/203; 709/219; 709/225; 709/227
(58) Field of Search ................................. 709/100, 200, 709/201, 202, 203, 204, 205, 219, 227, 330; 707/4, 8, 201

(56) References Cited

U.S. PATENT DOCUMENTS

| | | | |
|---|---|---|---|
| 4,937,784 A | * | 6/1990 | Masai et al. ................. 709/203 |
| 5,519,696 A | | 5/1996 | Willmann et al. |
| 5,655,120 A | | 8/1997 | Witte et al. |
| 5,761,507 A | * | 6/1998 | Govett ........................ 709/104 |
| 5,956,714 A | * | 9/1999 | Condon .......................... 707/8 |

FOREIGN PATENT DOCUMENTS

GB  2 281 793 A  3/1995

OTHER PUBLICATIONS

Amy Apon et al, "The Circulating Processor Model of Parallel Systems", IEEE Transactions on Computers, vol. 46, No. 5, May 1997, S. 572–587.

K. Baumgartner et al, "A Load Balancing Strategy for Local Computer Systems with Multiaccess Networks", IEEE Transactions on Computers, vol. 38, No. 8, Aug. 1989, pp. 1098–1109.

Y. Wang et al, "Load Sharing in Distributed Systems", IEEE Transactions on Computers, vol. C–34, No. 3, Mar. 1985, pp. 204–217.

\* cited by examiner

*Primary Examiner*—Majid A. Banankhah
(74) *Attorney, Agent, or Firm*—Sughrue Mion, PLLC

(57) ABSTRACT

A method for assigning tasks for processing received from one or several client data processing nodes within a group of at least two server data processing nodes to one of the server data processing nodes, as well as a server data processing system, a client data processing node and a machine-readable storage medium for carrying out this process. A client data processing node that has a task to assign, first selects the server data processing node from the group that is the next server data processing node to be selected based on a predefined cyclical order. If the server data processing node that is selected first denies the processing of the task, the client data processing node randomly selects a different server data processing node for processing the task. Otherwise, the client data processing node assigns the task to the selected server data processing node.

16 Claims, 3 Drawing Sheets

METHOD FOR ASSIGNING TASKS, DATA PROCESSING SYSTEM, CLIENT DATA PROCESSING NODES AND MACHINE-READABLE STORAGE MEDIUM

This application is based on and claims the benefit of German Patent Application No. 198 22 543.1 filed May 20, 1998, which is incorporated by reference herein.

BACKGROUND OF THE INVENTION

The subject of the invention is a method for assigning tasks within a group of at least two server data processing nodes, a data processing system, a client data processing node and a machine-readable storage medium.

The invention is based on a load distribution method customary in client-server applications.

A client computer is connected to several server computers via a communications network. The server computers periodically send messages to the client computer that provide information on their usage. The client computer stores this information. If the client computer has a data processing task it needs to assign, it uses the stored usage information of the server computers and selects the server computer that has the lowest usage. It then assigns the task to the server computer that it selected in this manner by sending a request for processing the data processing task and thus assigns the data processing task for processing to this particular server. This process ensures that the server computers all are used evenly.

This process is disadvantageous in that it entails a high traffic volume on the communications network. All server computers must send periodic messages. In order to obtain a current data on the usage, the time periods in between messages must not be very long.

SUMMARY OF THE INVENTION

The object of the invention is to assign tasks from client data processing nodes to server data processing nodes while maintaining an even use of the server data processing nodes and while keeping the communications traffic between client and server data processing nodes at a minimum.

The object of the invention is attained with the help of a process for assigning tasks within a group of at least two server data processing nodes, a data processing system, a client data processing node and a machine-readable storage medium.

Client and server data processing nodes can be comprised of different computers of a multi-computer system, of different processors of a multi-processor system or of different processes or objects that run on a system platform.

The invention is based on the concept to first try to assign a task to a cyclically selected server data processing node and if the server data processing node does not accept the task (because it already runs at capacity), to try, repeatedly if necessary, to assign the task to a randomly selected server data processing node. A first cyclic assignment attempt, therefore, is followed by one or several random assignment attempts.

Tests showed that this particular assignment scheme results in an even use of the server data processing nodes in all load areas and that the number of the required assignment attempts is minimized in the process. The assignment scheme also can be carried out with only a small number of computers that is mostly independent of the number of client and server data processing nodes of the data processing system. The method in accordance with the invention thus combines very good performance with few technical requirements.

Another advantage of the invention is the fact that one or several messages are exchanged only when a task is assigned; apart from this, no other exchange of information is required between the client and the server data processing nodes. This reduces the communications load considerably, especially when a large number of client and server data processing nodes are involved.

Advantageous embodiments of the invention are described in the sub-claims.

It is especially advantageous when the client data processing nodes make the cyclical selection independent from each other. This means that there must be no synchronization between the client data processing nodes.

BRIEF DESCRIPTION OF THE DRAWING

The invention is described in more detail in the following paragraphs with the help an exemplary embodiment and the attached drawings.

DETAILED DESCRIPTION OF THE INVENTION

Figure 1:
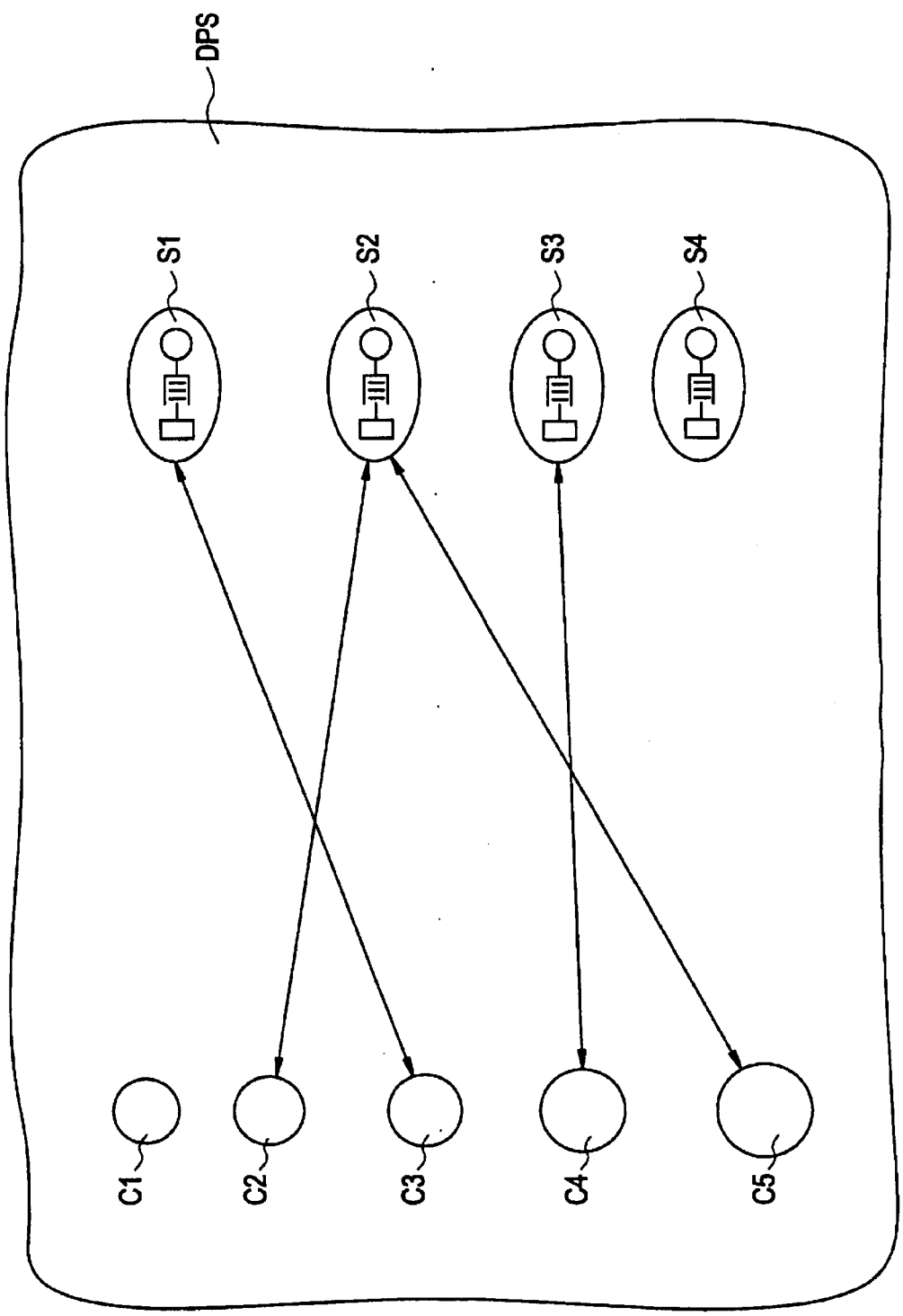
FIG. 1 shows a block diagram of a data processing system in accordance with the invention and a client data processing node in accordance with the invention.

FIG. 1 shows a data processing system DPS with several client data processing nodes C1 through C5, and with several server data processing nodes S1 through S4 that communicate with each other.

The data processing system DPS is a multi-computer system and realizes a part of a distributed control of an exchange. Of course it also is possible for the data processing system DPS to fulfill a different distributed control function.

The number of client and server data processing nodes only serves as an example. However, there must be at least two server data processing nodes. Each of the client data processing nodes C1 through C5, and the server data processing nodes S1 through S4, is comprised of a computer that, in turn, has at least one processor, one memory and peripheral communications components and programs that run on this computer. The client and the server processing nodes C1 through C5 and S1 through S4 are connected via a communications network. Hereby the communications network is comprised of the coupling network of the exchange and connection lines to the server data processing nodes S1 through S4. However, it can also be a LAN (local area network) or any type of communications network for computer communications.

When they fulfill their function, the client data processing nodes C1 through C5 regularly or irregularly request the processing of a task from one of the server data processing nodes S1 through S4. In FIG. 1, for example, server data processing nodes S1 through S3 are each processing a task of client data processing nodes C3, C2, C5 or C4.

Server data processing nodes S1 through S5 are each capable of carrying out a certain type of task. Thus they make up a group of server data processing nodes that are capable of carrying out certain type of tasks. Examples of such a task can be the calculation for given start values, carrying out data manipulation or triggering physical elements. All server data processing nodes all are capable of carrying out such tasks.

Server data processing nodes S1 through S4, depending on the available resources, can process one task at a time or a certain number of tasks simultaneously. It also is possible that they have a queue for tasks in which the tasks that are to be processed are placed in intermediate storage.

Client data processing nodes C1 through C5 can be different processes or objects of a computer system that request the processing of tasks from other processes or objects of a different or the same computer system. These other processes or objects are the server data processing nodes. Hereby, it is advantageous that the server data processing nodes are comprised of processes or objects that run on different computers and thus do not compete with each other with regard to system resources. The communication between such data processing nodes can occur via a CORBA infrastructure, for example (CORBA=Common Object Request Broker Architecture).

It is also possible for the data processing system DPS to be comprised of a multi-processor system in which the server data processing nodes present different processors to which client data processing nodes C1 through C5 direct requests for carrying out tasks. Client data processing nodes C1 through C5 also present different processors or different processes of one or several processors.

Figure 2:
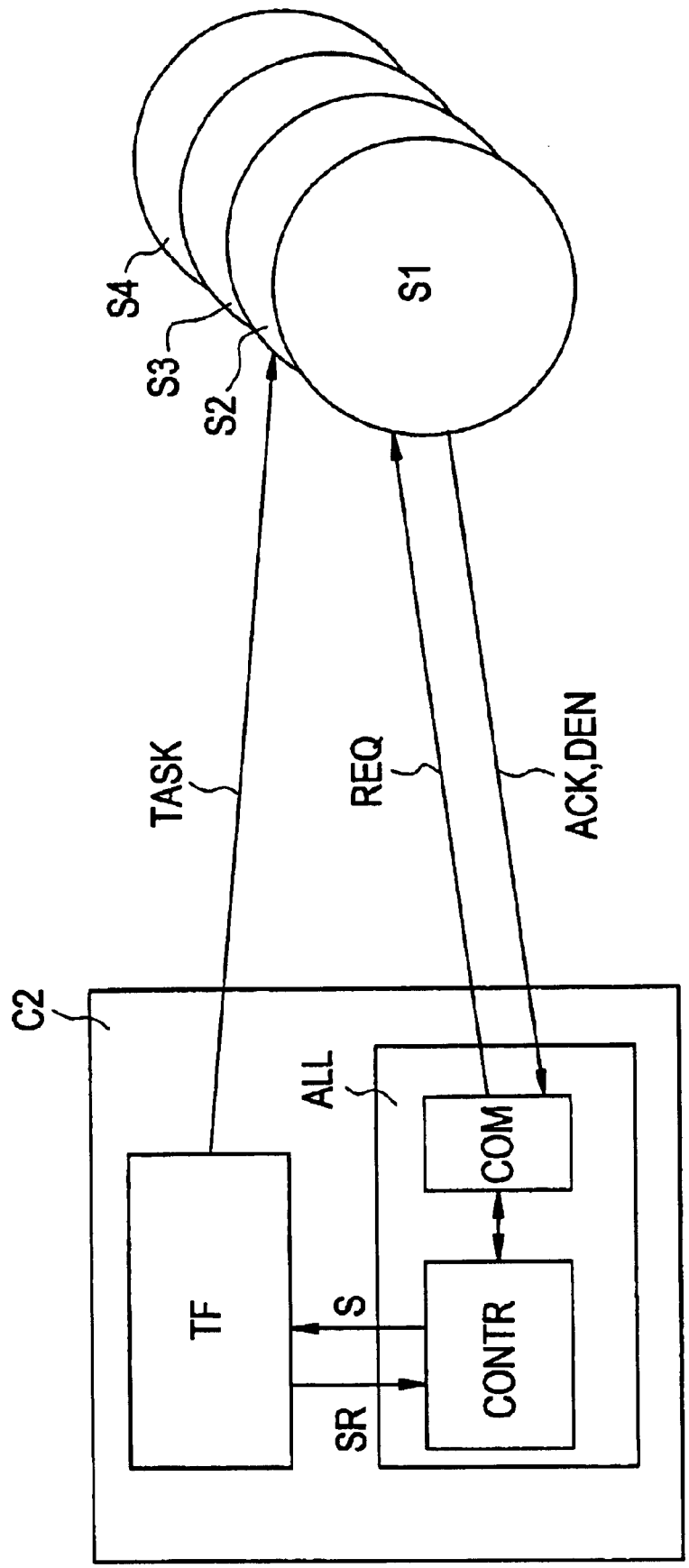
FIG. 2 shows a functional presentation of a section of the data processing system in accordance with the invention and FIG. 1 and with a client data processing node in accordance with the invention.

An example of the functional structure of a client data processing node now is explained with the help of FIG. 2 and how client data processing node C2 works.

FIG. 2 shows client data processing node C2 and server data processing nodes S1 through S4. Client data processing node C2 has two program modules, TF and ALL.

Program module TF request the execution of a certain task through a client data processing node and, to this end, activates program module ALL via a request SR. From a functional point of view, program module ALL is an assignment unit and determines the server data processing node in the group of the server data processing nodes S1 through S4 to which the task should be assigned for processing. Of course the functions of the ALL program module can also be realized in hardware, which is especially advantageous if data processing system DPS is a multi-processor system. Address S of this server data processing node then is transferred to program module TF which, in turn, using a TASK message, assigns the task to this server data processing node, in this case server data processing node S2, for processing.

It also is possible, using a REQ message, for the task to be immediately assigned to the server data processing node. Program module ALL, for example, sends messages REQ and TASK together to server data processing node S2. In such an exemplary embodiment, the task is transferred from program module TF to program module ALL for assignment purposes and the program module independently transfers the processing of the task to a server data processing node or informs program module TF that such a transfer currently is not possible. The immediate transfer of the task also makes it possible for the server data processing node to clearly determine what the execution of the task requires. If the server data processing node denies the execution of the task, it sends message DEN to program module ALL. It is not necessary to send an ACK message.

From a functional point of view program module ALL has two functional groups, CONTR and COM. Functional group COM has those functions that allow program module ALL to communicate with server data processing nodes S1 through S4 on the system platform. Functional group CONTR uses the functions of functional group COM to determine address S following request SR. To this end, it sends REQ messages to the server data processing nodes of server data processing nodes S1 through S4 using functional group COM and receives massages ACK and DEN from them.

Figure 3:
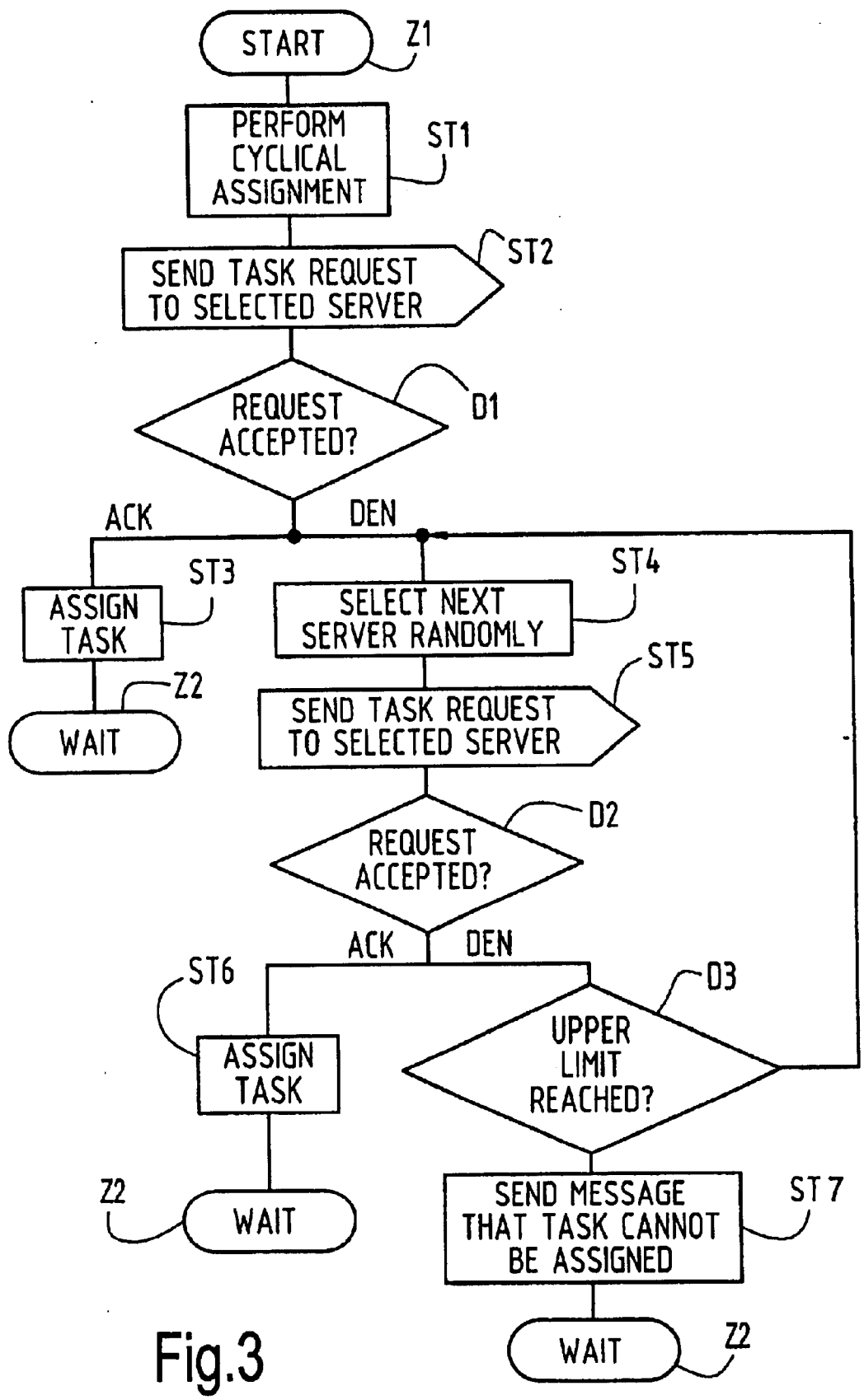
FIG. 3 shows a flow chart that describes the process carried out by the client data processing node in accordance with FIG. 2.

The functions of functional group CONTR now are explained with the help of the flow chart shown in FIG. 3, which shows two states, Z1 and Z2, seven steps, ST1 through ST7 and three decision steps, D1 through D3.

Request SR causes waiting condition Z2 to switch over to start condition Z1. This causes the selection of a server data processing node from the group of server data processing nodes S1 through S4 in a first step S1 with the node being the next server data processing node to be selected based on a predefined cyclic sequence of the server data processing nodes. To this end, each of the server data processing nodes S1 through S4 is assigned a number in ascending order, which means server data processing nodes S1 through S4 are assigned the number 1, 2, 3 or 4. In each cyclical assignment that is carried out by client data processing node C2, i.e. each time when step ST1 is carried out, a counter is incremented by 1, whereby the counter is reset to one once five is reached (Modulo-addition). The next server data processing node that is to be selected cyclically, then, is the server data processing node that is assigned the new counter value.

As an alternative, it is possible to arrange the addresses of the server data processing nodes on a list in random order. During each cyclic assignment through client data processing node C2, the pointer is set to the next entry on the list whereby the pointer is set to the first entry on the list once the end of the list is reached. The next server data processing node that is to be selected cyclically then is the server data processing node to whose address the pointer points.

It also is possible that only one counter or pointer is available for all client data processing nodes C1 through C5 that is advanced each time one of the client data processing nodes C1 through C5 carries out a cyclical selection. This synchronizes the response of client data processing nodes C1 through C5.

It also is possible to select the server data processing node that, compared to the last server data processing node that was assigned a task (which is done in steps ST3 and ST6), is the next server data processing node that is to be cyclically selected in accordance with the predefined order (by number allocation, list position). Here, too, there is the alternative to base the process on the server data processing node that was assigned a task by this client data processing node or on the last server data processing node that was assigned a task by any one of the client data processing nodes C1 through C5.

In step ST2, a request REQ is sent to the server data processing node that was selected cyclically in step ST1 that asks the server data processing node to declare whether or not it can process a task. If this server data processing node cannot process the task because it already is processing other tasks, for example, or because its queue is full, it responds with a DEN message to the REQ message to client data processing node C2. If this is not the case, it responds with an ACK message with which it agrees to process the task. It also is possible for the selected server data processing node to send the DEN message when its usage exceeds a certain threshold.

Once client data processing node C2 receives the ACK message, it moves to step ST3 in decision step D1. When the DEN message is received, step ST4 is initiated.

In step ST3, the address of the cyclically selected server data processing node is transferred to program module TF as address S, this means the task, thus, is assigned to this server data processing node. Then the transition to waiting state Z2 takes place.

In step ST4, one of the other server data processing nodes of server data processing nodes S1 through S4 that has not yet been selected for this task is selected randomly. The random selection is based on an algorithm that provides pseudo-random figures. Of course it is also possible to select any of server data processing nodes S1 through S4 with the help of a random sequence generator. In this case it is advantageous not to select the server data processing node that was selected last. In step ST5, a request REQ is sent to the randomly selected server data processing node. If the request of this server data processing node receives an ACK message, decision step D2 is branched into step ST6; if a DEN message is received, branching into decision step D3 occurs.

In step ST6, the address of the randomly selected server data processing node is transferred to program module TF as address S and the task, thus, is assigned to this server data processing node. Then there is a transition to waiting condition Z2.

Decision step D3 checks whether the number of the random selection attempts of a server data processing node has reached an upper limit that was determined beforehand. For example, it is advantageous to limit the number of these assignment attempts to 4 with 1000 client data processing nodes and 255 server data processing nodes. If this is not the case, step ST4 sets in and otherwise, step ST7. It also is possible to carry out only one random assignment that would make decision step D3 obsolete.

In step ST7, program module ALL transmits a message to program module TF that indicates that it is currently impossible to assign a task to any of the server data processing nodes. Then there is a transition to waiting condition Z2. Following a pre-determined waiting period, program module TF then again initiates an assignment attempt

What is claimed is:

1. A method for assigning sequential tasks that originate from at least one client data processing node to a plurality of server data processing nodes, wherein the client data processing node executes the method to assign a task, the method comprising:

selecting a server data processing node from the plurality of server data processing nodes based on a predefined cyclic sequence for assigning sequentially tasks generated by the at least one client data processing node to a different server data processing node from the plurality of server data processing nodes;

assign the task to the selected server data processing node; and if the selected server data processing node that is first selected by the predefined cyclic sequence denies the task assignment, the at least one client data processing node randomly selects a different server data processing node from the plurality of server data processing nodes, wherein the at least one client data processing node will continue to attempt to assign the task to randomly selected server data processing nodes from the plurality of the server data processing nodes until either the task is accepted or a predetermined number of failed task assignments is reached.

2. The method in accordance with claim 1, wherein when the predetermined number of failed task assignments is reached, the at least one client data processing node waits for a predetermined amount of time before reinitiating the task assignment.

3. The method in accordance with claim 1, wherein the predefined cyclic sequence is based on a modulo counter.

4. The method in accordance with claim 1, wherein the predefined cyclic sequence lists each of the server data processing nodes in the plurality of the server data processing nodes in a defined sequence.

5. The method in accordance with claim 1, wherein a random number generator is used to randomly select a different server data processing node.

6. A data processing system, comprising:

a plurality of server data processing nodes adapted to process tasks;

a client data processing node adapted to request the processing of tasks that are generated in the client data processing node, wherein the client data processing node comprises an assignment unit adapted to:

select a server data processing node from the plurality of server data processing nodes based on a predefined cyclic sequence for assigning tasks to the plurality of server data processing nodes, wherein the predefined cyclic sequence assigns each sequentially generated task to a different server data processing node within the plurality of server data processing nodes;

assign the task to the selected server data processing node; and if the selected server data processing node that is first selected by the predefined cyclic sequence denies the task assignment, the assignment unit randomly selects a different server data processing node from the plurality of server data processing nodes, wherein the assignment unit will continue to attempt to assign the task to randomly selected server data processing nodes from the plurality of server data processing nodes until either the task is accepted or a predetermined number of failed task assignments is reached.

7. A client data processing node adapted to request the processing of tasks, generated by the client data processing node, by a plurality of server data processing nodes, wherein the client data processing node comprises an assignment unit that, for a task to be assigned by the client data processing node, is adapted to:

select a server data processing node from the plurality of server data processing nodes based on a predefined cyclic sequence for assigning tasks to the plurality of server data processing nodes, wherein the predefined cyclic sequence assigns each sequentially generated task to a different server data processing node within the plurality of server data processing nodes;

assign the task to the selected server data processing node; and if the selected server data processing node that is first selected by the predefined cyclic sequence denies the task assignment, the assignment unit randomly selects a different server data processing node from the plurality of server data processing nodes, wherein the assignment unit will continue to attempt to assign the task to randomly selected server data processing nodes from the plurality of server data processing nodes until either the task is accepted or a predetermined number of failed task assignments is reached.

8. The client data processing node according to claim 7, wherein when the predetermined number of failed task assignments is reached, the client data processing node waits for a predetermined amount of time before reinitiating the task assignment.

9. The client data processing node according to claim 7, wherein the predefined cyclic sequence is based on a modulo counter.

10. The client data processing node according to claim 7, wherein the predefined cyclic sequence lists each of the server data processing nodes in the plurality of the server data processing nodes in a defined sequence.

11. The client data processing node according to claim 7, wherein the client data processing node uses a random number generator to randomly select a different server data processing node.

12. A machine-readable storage medium bearing a program adapted to control the assignment of sequential tasks for processing to a plurality of server data processing nodes, the program being executed by a client data processing node and the tasks being generated by the client data processing node, wherein, when the program assigns a task, the program is adapted to:

select a server data processing node from the plurality of server data processing nodes based on a predefined cyclic sequence for assigning tasks to the plurality server data processing nodes, wherein the predefined cyclic sequence assigns each sequentially generated task to different server data processing nodes, assign the task to the selected server data processing node; and if the selected server data processing node that is first selected by the predefined cyclic sequence denies the assignment of the task, the program randomly selects a different server data processing node from the plurality of server data processing nodes, wherein the program will continue to attempt to assign the task to randomly selected server data processing nodes from the plurality of server data processing nodes until either the task is accepted or a predetermined number of failed task assignments is reached.

13. The program according to claim 12, wherein when the predetermined number of failed task assignments is reached, the program waits for a predetermined amount of time before reinitiating the task assignment.

14. The program according to claim 12, wherein the predefined cyclic sequence is based on a modulo counter.

15. The program according to claim 12, wherein the predefined cyclic sequence lists each of the server data processing nodes in the plurality of the server data processing nodes in a defined sequence.

16. The program according to claim 12, wherein the program comprises a random number generator to randomly select a different server data processing node.

* * * * *